United States Patent [19]

Pricone et al.

[11] Patent Number: 4,486,363

[45] Date of Patent: Dec. 4, 1984

[54] METHOD AND APPARATUS FOR EMBOSSING A PRECISION OPTICAL PATTERN IN A RESINOUS SHEET

[75] Inventors: Robert M. Pricone, Vernon Hills; Sidney A. Heenan, Park Ridge, both of Ill.

[73] Assignee: Amerace Corporation, New York, N.Y.

[21] Appl. No.: 430,860

[22] Filed: Sep. 30, 1982

[51] Int. Cl.³ ............................................. B29D 11/00
[52] U.S. Cl. ....................................... 264/1.4; 264/1.6; 264/1.9; 264/2.7; 264/284; 425/174.4; 425/373; 425/385
[58] Field of Search .................... 264/1.3, 1.6, 1.9, 2.7, 264/284, 1.4; 425/384, 385, 174.4, 373

[56] References Cited

U.S. PATENT DOCUMENTS

| | | | |
|---|---|---|---|
| 2,442,443 | 6/1948 | Swallow | 425/384 |
| 2,915,787 | 12/1959 | Ewing et al. | 264/284 |
| 3,126,580 | 3/1964 | Paschke | 425/384 |
| 3,311,692 | 3/1967 | Baird | 425/385 |
| 3,535,417 | 10/1970 | Henker, Jr. | 264/284 |
| 3,758,649 | 9/1973 | Frattarola | 264/1.3 |
| 3,761,338 | 9/1973 | Ungar et al. | 264/284 |
| 3,810,804 | 5/1974 | Rowland | 264/1.9 |
| 3,842,152 | 10/1974 | Witfield, Jr. et al. | 264/284 |
| 3,954,368 | 5/1976 | Kawakami | 425/384 |
| 3,957,616 | 5/1976 | Montgomery | 264/1.9 |
| 4,332,847 | 6/1982 | Rowland | 264/284 |

*Primary Examiner*—James Lowe
*Attorney, Agent, or Firm*—David Teschner; Ronald A. Sandler

[57] ABSTRACT

Disclosed herein are a method and apparatus for continuously embossing a repeating pattern of precise detail, in particular, cube-corner type reflector elements, on one surface of a sheet of transparent thermoplastic material to form retroreflective sheeting. A continuous embossing tool in the form of a flexible thin metal belt or cylinder has on its outer surface an embossing pattern which is the reverse of the pattern to be formed. The embossing tool is continuously moved at a predetermined speed along a closed course through a heating station where the temperature of a portion of the embossing tool is raised to be above the glass transition temperature of the sheeting and a cooling station where the heated portion of the embossing tool is cooled to be below that glass transition temperature. The sheeting is continuously moved at the predetermined speed from a supply thereof into engagement with the embossing pattern on the tool and is pressed thereagainst continuously at a plurality of pressure points sequentially spaced along the heating station, with the one surface of the sheeting confronting and engaging the embossing pattern until the sheeting is raised above its glass transition temperature and conforms to the embossing pattern on one face. The sheeting is maintained in engagement with the tool until the tool passes the cooling station and the sheeting is lowered below its glass transition temperature and the pattern solidifies. The sheeting is thereafter stripped from the tool.

22 Claims, 9 Drawing Figures

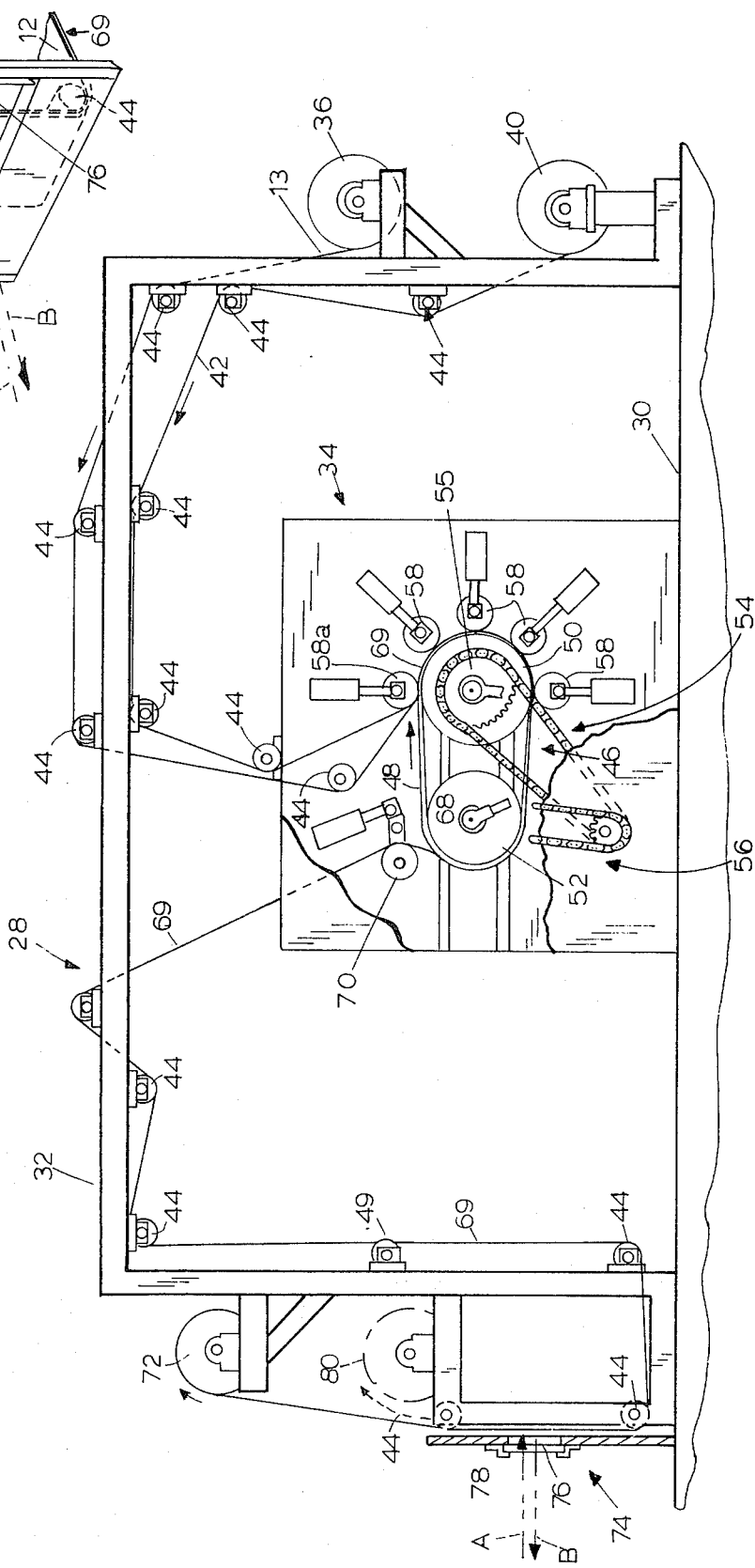

METHOD AND APPARATUS FOR EMBOSSING A PRECISION OPTICAL PATTERN IN A RESINOUS SHEET

CROSS-REFERENCE TO RELATED APPLICATION

Embossing Tool and Method of Producing Same by Anthony J. Montalbano and Robert M. Pricone, application Ser. No. 06/430,866 (attorney docket SP-82-3), filed on even date herewith and assigned to applicants' assignee.

BACKGROUND OF INVENTION

This invention relates to method and apparatus for producing sheeting having precision patterns where flatness and angular accuracy are important, such as for optical purposes, such as Fresnel lenses incorporating cadioptrics, precise flats, angles and uniform detail, and, more particulary, to method and apparatus for continuously embossing a repeating retroreflecting pattern of fine or precise detail on one surface of sheeting of transparent thermoplastic material to form the sheeting into the desired pattern. Specifically, the techniques are applicable to produce cube-corner type retroreflective sheeting.

Cube-corner type reflectors have been known for many years and many millions have been sold. The phrase "cube-corner" or "trihedral", or "tetrahedron" are art recognized terms for structure consisting of three mutually perpendicular faces, without regard to the size or shape of each face, or the optical axis of the element so provided. Each of the faces can assume a different size and shape relative to the other two, depending upon the angular reflective characteristics desired, and the molding techniques employed. One example of a cube corner type reflector is provided by Stimson U.S. Pat. No. 1,906,655, issued May 2, 1933, wherein there is disclosed a reflex light reflector including an obverse face and a reverse light reflecting face consisting of a plurality of cube corner reflector elements, each having three mutually perpendicular surfaces adapted for total internal reflection of light impinging thereon from the obverse face. Reflectors as taught by the Stimson patent are individually molded and are relatively quite thick and rigid. For many years now, the preferred material for reflectors as taught by the Stimson patent has been methyl methacrylate. Another example of a cube-corner type reflector is the rectangular parallelpiped disclosed in Heasley U.S. Pat. No. 4,073,568.

It long has been desired to obtain the benefits of cube-corner reflectors as used in pavement markers or for automotive purposes, but with the reflector in the form of flexible sheeting. This involves, among other things, a drastic reduction in the size of the cube-corner elements.

Cube-corner type reflectors, to retain their funtionality of reflecting light back generally to its source, require that the three reflective faces be maintained flat and within several minutes of 90° relative to each other; spreads beyond this, or unevenness in the faces, results in significant light spread and a drop in intensity at the location desired.

Prior attempts have been made to produce reflective sheeting wherein the reflective elements are of the cube-corner type. For many years, it was suggested that cube-corner sheeting could not be manufactured using embossing techniques (e.g. Rowland U.S. Pat. No. 3,684,348, Col. 5 ii. 30–42).

More recent attempts at embossing cube-corner sheeting is that of Rowland U.S. Pat. No. 4,244,683, issued Jan. 13, 1981. However, the method and apparatus of Rowland U.S. Pat. No. 4,244,683 are relatively quite complex and only semi-continuous or sequential in nature. Consequently, the Rowland teaching is quite costly to implement, maintain and operate. The operation is slow and the resultant reflective sheeting is quite costly. Moreover, to produce sheeting 48" wide, to be economically feasible, would be prohibitively expensive and complicated using the sequential mold technique of Rowland U.S. Pat. No. 4,244,683.

Also known are other prior techniques for embossing repeating patterns on thermoplastic sheeting, among which other prior techniques are those taught by the following:

Swallow U.S. Pat. No. 2,442,443, issued June 1, 1948;
Hochberg U.S. Pat. No. 3,157,723, issued Nov. 17, 1964;
Kloender U.S. Pat. No. 3,246,365, issued Apr. 19, 1966;
Bergh U.S. Pat. No. 4,097,634, issued June 27, 1978; and
Nyfeler et al. U.S. Pat. No. 4,223,050, issued Sep. 16, 1980.

These other prior techniques do not involve the production of retroreflective sheeting or the precision patterns required for optical purposes. As noted, in order for cube-corner reflective sheeting to be successful, the embossed cube-corner elements must be extremely accurately formed, much more so than is required of the embossed elements of these "other prior techniques", which, therefore, although they may be satisfactory for producing the intended products, may not be adaptable to the production of cube-corner reflective sheeting.

Accordingly, an important object of the present invention is to provide method and apparatus for embossing a repeating retroreflective pattern of cube-corner reflecting elements on one face of sheeting of transparent thermoplastic material, which method and apparatus operate continuously and are greatly simplified with respect to the prior art.

Another important object is to provide such method and apparatus which is less costly than the prior art, in terms of implementation and operation.

A further important object is to provide such method and apparatus enabling continuous production of cube-corner reflective sheeting of reduced cost.

The foregoing and other objects and advantages will appear from the following description of examples of the invention.

SUMMARY OF THE INVENTION

As stated, the present invention relates to a method and apparatus for continuously embossing a repeating retroreflecting pattern of cube-corner reflector elements on one surface of sheeting of thermoplastic material to form the sheeting into retroreflective sheeting. A continuous embossing tool in the form of a thin metal element has on its outer surface an embossing pattern which is the reverse of the retroreflecting pattern. The tool is continuously moved at a predetermined speed along a closed course through a heating station where the temperature of a portion of the embossing tool and pattern is raised to be above the glass transition temperature of the sheeting and a cooling station where the temperature of that portion of the embossing tool is lowered to be below that glass transition temperature. The sheeting is continuously moved at the predetermined speed from a supply thereof into engagement with the element and is pressed against the element either continuously or at a plurality of pressure points sequentially spaced along said heating station, with one surface of the sheeting confronting and engaging the embossing pattern until the sheeting softens and the one surface conforms to the embossing pattern. The sheeting is maintained in engagement with the tool until the tool passes the cooling station and the sheeting solidifies. The sheeting is thereafter stripped from the tool.

A preferred material for the sheeting is acrylic. The embossing tool may be a continuous belt or, in a modified form, a centerless drum having the embossing pattern on its outer surface.

Where the embossing tool is a continuous belt or flexible cylinder, the heating station is provided by an internally heated heating roller, the cooling station is provided by an internally cooled cooling roller and the belt passes over the heating roller and the cooling roller. The rollers are rotated to impart the movement to the belt.

Where the embossing tool is a centerless drum, the drum is rotated about its axis, in a single revolution passing a location where it is heated by an infrared heater or other radiant heating device, to a temperature above the glass transition temperature of the sheeting, a location where the sheeting is pressed against the embossing pattern continuously or at a plurality of pressure points while the embossing pattern remains above the glass transition temperature and a location where the embossing pattern and the sheeting are cooled, as by immersion in a liquid-filled trough, to be below the glass transition temperature. The sheeting is then stripped from the drum at a location of the drum circumferentially between the trough and the infrared heater.

It is preferable that the sheeting, prior to engaging the embossing tool, be engaged on its surface remote from the one surface, with a film of thermoplastic material, such as polyester (Mylar), having a glass transition temperature which is higher than that of the sheeting and higher than the temperature of the embossing pattern at the heating station, so that the pressure points exert pressure on the sheeting through the film to cause the one surface of the sheeting to conform to the embossing pattern. The film acts as a carrier for the sheeting in its weak, molten condition and after cooling keeps the sheeting from tearing. The film also acts as an interleaf between the sheeting and the pressure points, which preferably are pressure rollers of silicone rubber with a durometer hardness from Shore A 60 to 90, which would otherwise tend to stick to the sheeting.

Preferably, when used for retroreflective products, the film also is transparent, so that without being removed from the reflective sheeting, the optical properties of the reflective sheeting can be monitored on a continuous basis.

In the practice of the invention to make cube-corner sheeting, it is preferable that the sheeting be heated to a temperature above its glass transition temperature, that while the sheeting is so heated it is pressed and re-pressed and kept in constant engagement against the tool pattern so that it flows into complete conformance with the embossing pattern and that it remains in such conformance until it is cooled sufficiently to be below its glass transition temperature before being stripped from the embossing tool.

DESCRIPTION OF THE DRAWING

The invention will be described with reference to the accompanying drawings in which:

FIG. 4 is an elevation of a preferred machine constructed in accordance with the invention for producing the reflective sheeting of FIGS. 1 and 3, the machine including embossing means comprising an embossing tool in the form of a continuous flexible cylinder, or belt and, in the lower lefthand corner, a device for exposing a controlled area of embossed sheeting for continuously monitoring the optical performance of the reflective sheeting;

FIG. 5 is an enlarged perspective view of the device shown in the lower lefthand corner of FIG. 4;

DESCRIPTION OF THE ILLUSTRATED EMBODIMENTS

Figure 1:
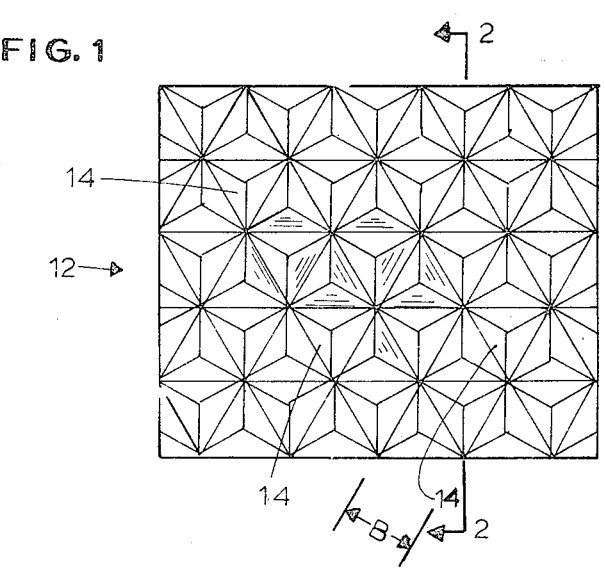
FIG. 1 is a plan view, greatly enlarged and somewhat fragmentary, of the embossed surface of one form of reflective sheeting produced by the present invention.

FIG. 1 shows in plan view the rear surface of a portion of flexible reflective sheeting 12 of transparent thermoplastic material having embossed on one surface thereof a repeating retroreflecting pattern of cube-corner type reflector elements 14. The thermoplastic material may advantageously be acrylic. Sheeting 12 initially had parallel front and back surfaces and was initially on the order of 0.006 inch thick.

Figure 2:
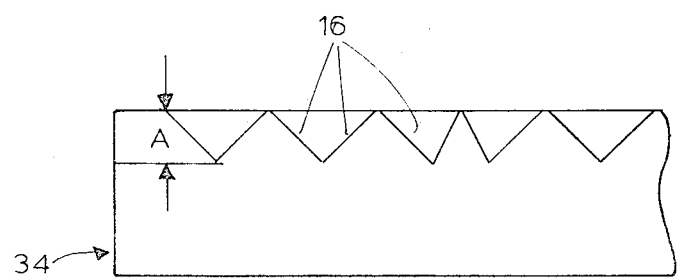
FIG. 2 is a side elevation, somewhat fragmentary and somewhat schematic and very enlarged view, showing the embossing pattern of an embossing tool for embossing the retroreflecting pattern of the sheeting of FIG. 1, as though taken in the direction of the arrows 2—2 in FIG. 1, except that the tool is of female cubes and the sheeting of male cubes.

The retroreflecting pattern of elements 14 was formed with the aid of an embossing tool of a thin flexible belt or cylinder of the type produced in accordance with the cross referenced invention entitled Embossing Tool and Method of Producing Same. As Shown in FIG. 2, the embossing tool has on one surface an embossing pattern 16, the depth of which is indicated by dimension A. One example for dimension A may be 0.00338 inch. Dimension B on FIG. 1 represents the distance between parallel grooves, which, for the "A" dimension provided, would be about 0.0072 inch.

In order for sheeting 12 to have adequate optical properties, the embossing pattern 16 must be extremely accurately formed and the retroreflective pattern of the cube corner elements 14 must be an extremely acccurate reverse reproduction of the embossing pattern 16. Thus, the embossed surface of the sheeting 12 must conform to the embossing pattern 16 with an extremely high degree of accuracy.

Figure 3:
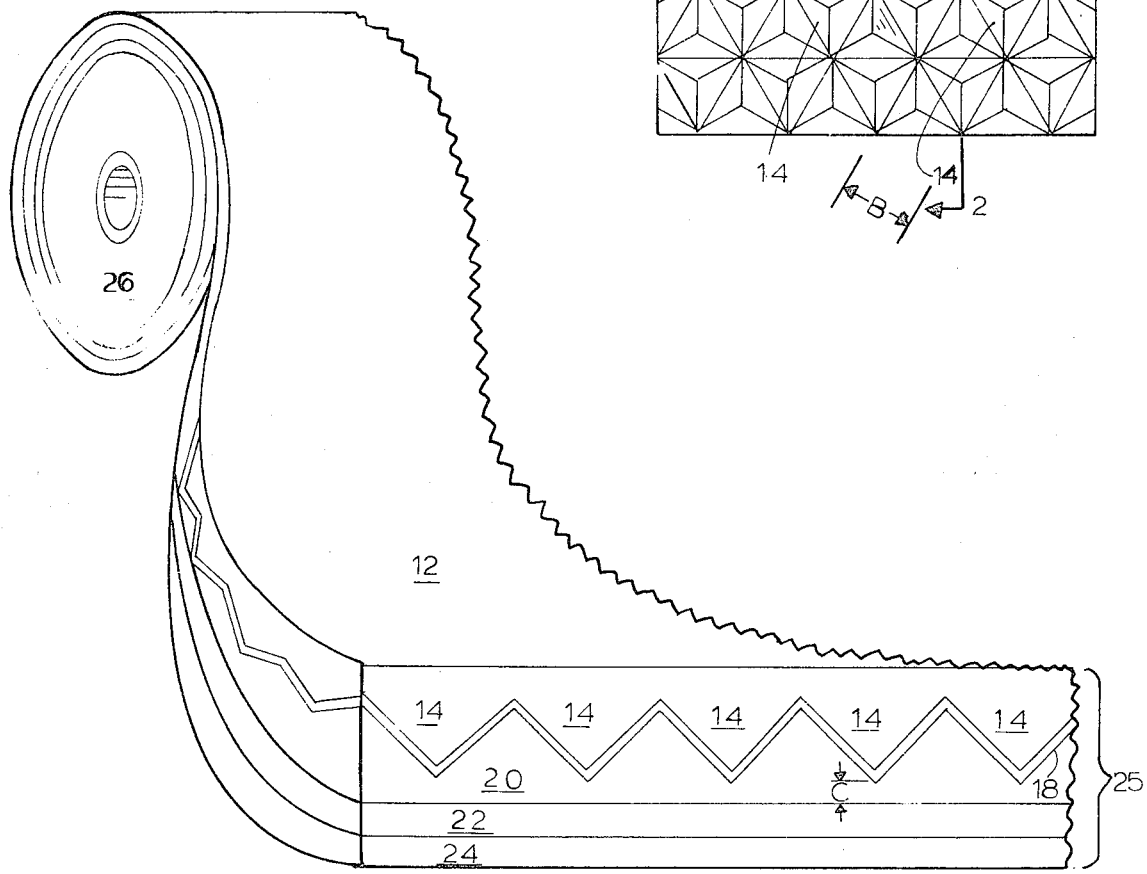
FIG. 3 is a perspective, somewhat schematic view of one form of reflective sheeting produced by the present invention, after further processing has rendered the sheeting ready for installation.

FIG. 3 shows one form of sheeting 12 produced by the present invention, after further processing and ready for use. More specifically, the retroreflective pattern of cube corner elements 14 may be covered with a metallized layer 18, which in turn may be covered by a suitable backing material 20, in turn covered by a suitable adhesive 22 (for mounting), in turn covered by release paper 24. The thickness of the metallizing layer 18 is immeasurable. Backing material 20 may have a thickness, dimension C, of about 0.001 inch and the thickness of adhesive 22 may be about 0.0015 inch. The total thickness of the complete structure 25 is about 0.010 inch, and it is flexible enough so it can be rolled and readily stored on a supply reel 26. The sheeting 12 may be any desired color, to impart that color to retroreflected light. The details of applying a back coat and adhesive are well known in the art and similar to that used in the manufacture of "glass bead" type sheeting.

A preferred machine 28 for producing the cube corner sheeting 12 is shown in elevation in FIG. 4, suitably mounted on a floor 30. Machine 28 includes a frame 32, centrally located within which is embossing means 34.

A supply reel 36 of unprocessed acrylic web 13 is mounted on the right hand end of frame 32, as is a supply reel 40 of transparent plastic film such as Mylar film 42. The web 13 may be 0.006 inch thick and the film 42 may be 0.002 inch thick. The flat web 13 and the film 42 are fed from reels 36 and 40, respectively, to the embossing means 34, over guide rollers 44, in the direction of the arrows.

The embossing means 34 includes an embossing tool 46 in the form of an endless metal belt 48 which may be about 0.020 inch in thickness and 54 inches in "circumference" and 22 inches wide. The width and circumference of the belt 48 will depend in part upon the width or material to be embossed and the desired embossing speed and the thickness of the belt 48. Belt 48 is mounted on and carried by a heating roller 50 and a cooling roller 52 having parallel axes. Rollers 50 and 52 are driven by chains 54 and 56, respectively, to advance belt 48 at a predetermined linear speed in the direction of the arrow. Belt 48 is provided on its outer surface with a continuous female embossing pattern 16 (FIG. 2).

Evenly spaced sequentially around the belt, for about 180° around the heating roller 50, are a plurality, at least three, and as shown five, of pressure rollers 58 of a resilient material, preferably silicone rubber, with a durometer hardness ranging from shore A 20 to 90, but preferably, from Shore A 60 to 90.

While rollers 50 and 52 could be the same size, in machine 28 as constructed, the diameter of heating roller 50 is about 10½ inches and the diameter of cooling roller 52 is about 8 inches. The diameter of each roller 58 is about 6 inches.

It may be desirable to maintain additional pressure about the tool and sheet during cooling, in which case the cooling roller 52 could be larger in diameter than the heating roller, and a plurality of additional pressure rollers, (not shown) also could be positioned about the cooling roller.

Figure 6:
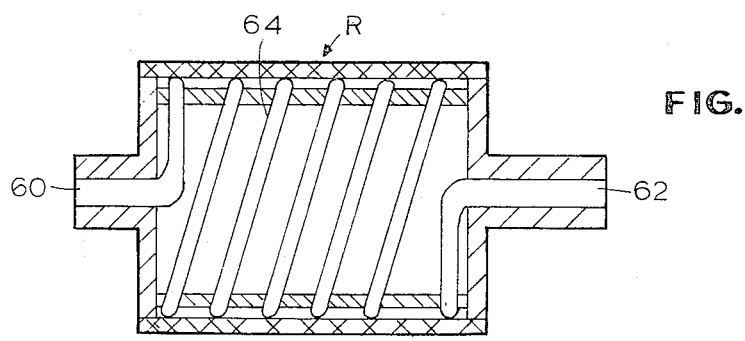
FIG. 6 is an axial section of either a heating roller or a cooling roller.

FIG. 6 illustrates a roller R, which may be either heating roller 50 or cooling roller 52, having axial inlet and outlet passages 60 and 62, joined by an internal spiral tube 64 for circulation therethrough of hot oil (in the case of heating roller 50) supplied through a line 55 or other material (in the case of cooling roller 52) supplied through a line 68.

The web 13 and the film 42, as stated, are fed to embossing means 34, where they are superimposed to form a laminate 69 which is introduced between the belt 48 and the leading pressure roller 58a, with web 13 between the film 42 and the belt 48. From thence, the laminate 69 is moved with the belt 48 to pass under the remaining pressure rollers 58 and around the heating roller 50 and from thence along belt 48 around a substantial portion of cooling roller 52. Thus, one face of web 13 directly confronts and engages embossing pattern 16 and one face of the film 42 directly confronts and engages pressure rollers 58.

The film 42 provides several functions during this operation. First, it serves to maintain the web 13 under pressure against the belt 48 while traveling around the heating and cooling rollers 50 and 52 and while traversing the distance between them, thus assuring conformity of the web 13 with the precision pattern 16 of the tool during the change in temperature gradient as the web (now embossed sheet) drops below the glass transition temperature of the material. Second, the film maintains what will be the outer surface of sheet in a flat and highly finished surface for optical transmission. Finally, the film acts as a carrier for the web in its weak "molten" state and prevents the web from adhering to the pressure rollers 58 as the web is heated above the glass transition temperature.

The embossing means 34 finally includes a stripper roller 70, around which laminate 69 is passed to remove the same from the belt 48, shortly before the belt 48 itself leaves cooling roller 52 on its return path to the heating roller 50.

The laminate 69 is then fed from stripper roller 70 over further guiding rollers 44, eventually emerging from frame 32 at the lower lefthand corner thereof. Laminate 69 is then wound onto a storage winder 72 mounted on the outside of frame 32 at the lefthand end thereof and near the top thereof. On its way from the lower lefthand corner of frame 32 to winder 72, the laminate 69 is guided by additional guiding rollers 44, with the film 42 facing outwardly, past a monitoring device 74 for continuously monitoring the optical performance of the reflective sheeting. This is referred to below.

The heating roller 50 is internally heated (as aforesaid) so that as belt 48 passes thereover through the heating station, the temperature of the embossing pattern 16 at that portion of the tool is raised sufficiently so that web 13 is heated to a temperature above its glass transition temperature, but not sufficiently high as to exceed the glass transition temperature of film 42. For the acrylic web (or sheeting) 13 and polyester film 42, a suitable temperature for heating roller 50 in the heating station is in the range from 425° F. to 475° F. and preferably about 450° F.

The cooling roller 52 is internally heated (as aforesaid) so that as belt 48 passes thereover through the cooling station, the temperature of the portion of the tool embossing pattern 16 is lowered sufficiently so that sheeting 12 is cooled to a temperature below its glass transition temperature, and thus becomes completely solid prior to the time laminate 69 is stripped from tool 46. For acrylic sheeting 13, a suitable temperature for cooling roller 50 in the cooling station is 200° F. or lower and preferably about 180° F.

It has been found that the laminate 69 can be processed through the embossing means 46 at the rate of about 3 to 4 feet per minute, with satisfactory results in terms of the optical performance and other pertinent properties of the finished reflective sheeting.

Monitoring device 74 is shown in FIGS. 4 and 5. It essentially includes a rectangular window 76 and an adjustable shutter 78. Laminate 69 traverses window 76 and, as it does so, light from a light source (not shown) impinges thereon as indicated by arrow A, at an entrance angle of essentially 0° and is reflected by the embossed retroreflective cube-corner pattern on reflective sheeting 12. The retroreflective light, indicated by arrow B, is continuously measured by the light sensor of a photometer (not shown).

Usually, when machine 28 is started up, reflective sheeting 12 does not have adequate optical properties. Therefore, a scrap winder 80 is mounted on the outside of frame 32 at the lefthand end thereof, below storage winder and above monitoring device 74. Laminate 69 is wound onto scrap winder until adequate optical performance is obtained, at which time the laminate 69 is cut and fed to storage winder 72.

Storage winder 72 and scrap winder 80 are power driven to take up laminate at substantially the predetermined linear speed of advance of belt 48.

Prior to shipping reflective sheeting 12, the film 42 may be stripped therefrom.

Figure 7:
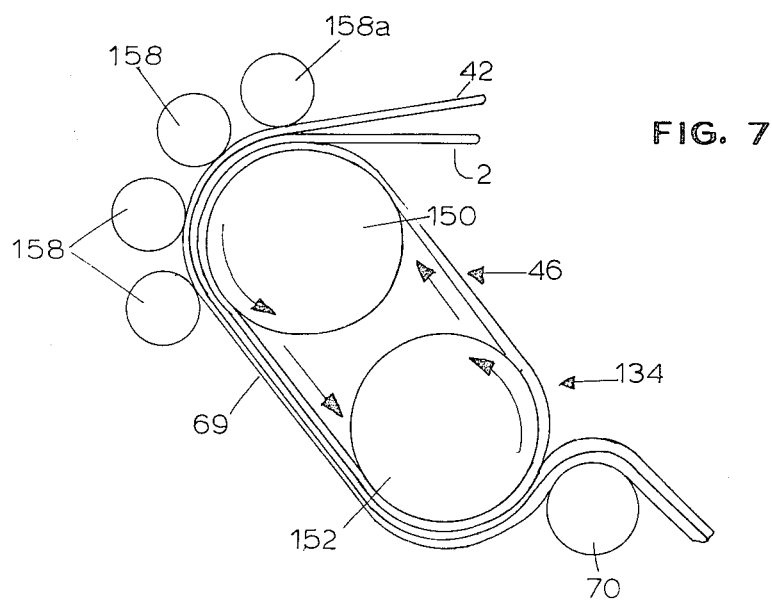
FIG. 7 shows a first modified form of embossing means.

FIG. 7 shows a first modified embossing means 134 which differs from embossing means 34 essentially in that in embossing means 34, the heating roller 150 and the cooling roller 152 are about the same size and the embossing means 34 has only four pressure rollers 158, whereas in embossing means 34, heating roller 50 and cooling roller 52 are different in size, and embossing means 34 has five pressure rollers 58.

Figure 8:
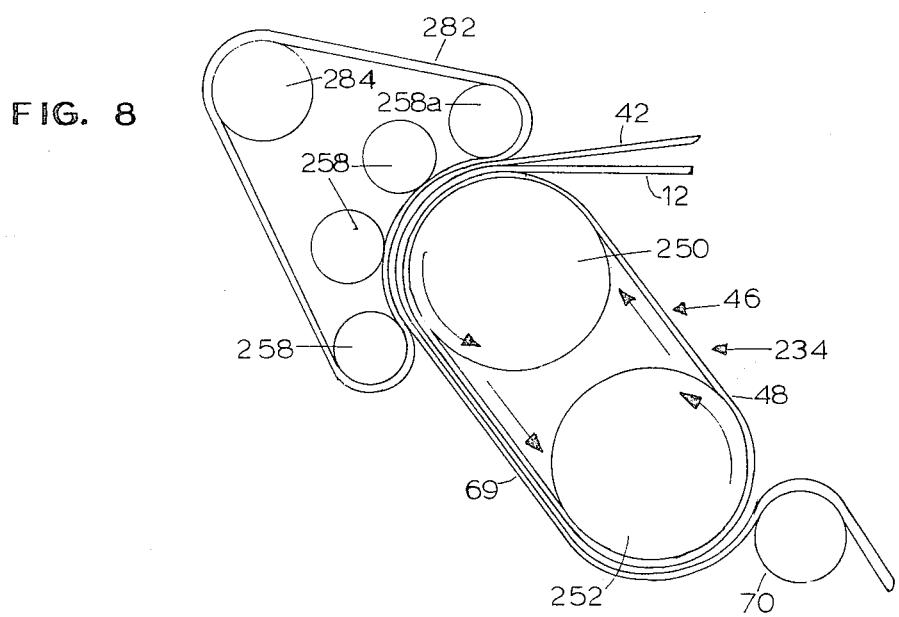
FIG. 8 shows a second modified form of embossing means.

FIG. 8 shows a second modified embossing means 234 which differs from embossing means 134 by virtue of the inclusion in embossing means 234 of an endless stainless steel strap 282 which is interposed between the pressure rollers 258 and belt 48 so as to exert additional forming pressure on laminate 69 between adjacent ones of pressure rollers 258. The embossing means 234 further includes an auxiliary driven roller 284, and strap 282 passes around auxiliary roller 284, in addition to pressure rollers 258. This strap 282 is intended to keep more uniform pressure on the web or sheet 13 and the resulting laminate 69.

Figure 9:
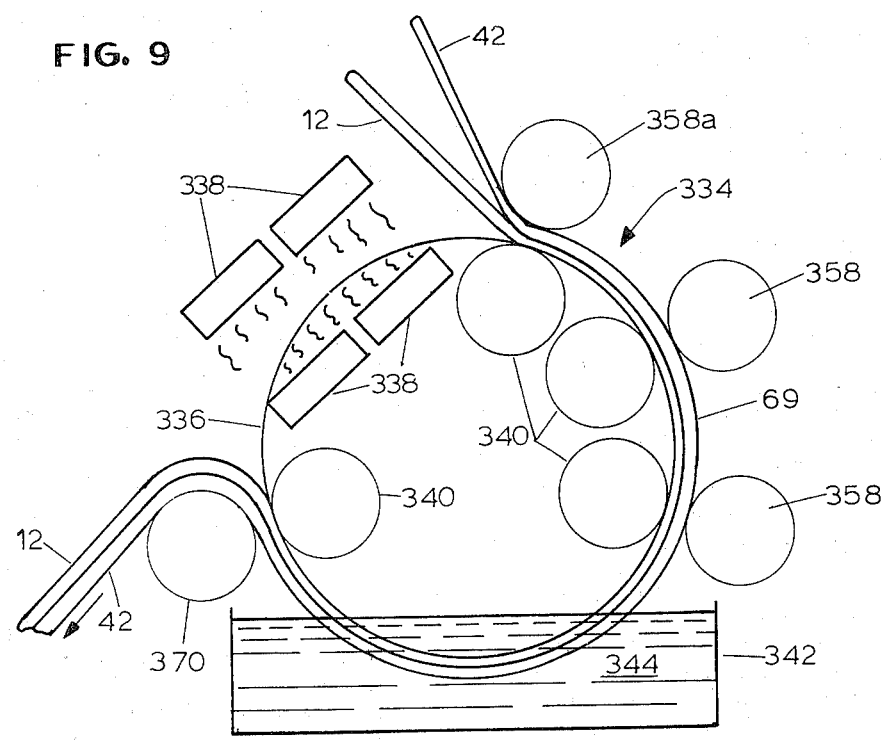
FIG. 9 shows a third modfied form of embossing means.

FIG. 9 shows a third modified embossing means 334, comprising an embossing tool in the form of a metallic centerless cylindrical drum 336 having an embossing pattern on its outside surface, an infrared heater means 338 near the top of drum 336, three pressure rollers 358, a stripper roller 370, reinforcing rollers 340 which prevent drum 336 from being deformed by pressure rollers 358 and stripper roller 70, and a trough 342 containing cooling liquid 344 in which the bottom of drum 336 is immersed. Drum 336 is rotated in the clockwise direction so that the embossing pattern travels at the predetermined speed past infrared heater 338 which heats the embossing pattern to a temperature above the glass transition temperature of sheeting 12. Drum 336 then passes pressure rollers 358 and enters cooling liquid 344. The drum 336 may be considerably thicker than the belt used in the embodiment of FIG. 4 since it does not flex in an ellipitical path as does belt 34.

The portion of the course of drum 336 from heater 338 to cooling liquid is the heating station of this modification, and the portion of the course of drum through liquid 344 is its cooling station, and upon emerging from liquid 344, the embossing pattern is at a temperature below the glass transition temperature of sheeting 13.

In the FIG. 9 modification, the sheeting or web 13 and film 42 are fed to embossing means 334, where they are superimposed to form the laminate 69 which is introduced, in the heating station, between drum 336 and the leading pressure roller 58a, with sheeting 13 between film 42 and drum 336.

It should be noted that reference numeral 13 may refer indiscriminately herein to the embossed sheeting or web in its initial form, to its in-process form or to its final reflective form, as appropriate.

The term "glass transition temperature" is a well known term of art and is applied to thermoplastic materials as well as glass. It is the temperature at which the material begins to flow when heated. For various extendable types of acrylic, the glass transition temperatures begin at about 200° F. For polyester (Mylar), it begins at about 480° F. to 490° F.

A preferred material for the embossing tools disclosed herein is nickel. The very thin tool (about 0.010" to about 0.030") permits the rapid heating and cooling of the tool, and the sheet, through the required temperatures gradients while pressure is applied by the pressure rolls and the carrier film. The result is the continuous production of a precision pattern where flatness and angular accuracy are important while permitting formation of sharp corners with minimal distortion of optical surfaces, whereby the finished sheet provides high optical efficiency.

The invention, in its various aspects and disclosed forms, is well adapted to the attainment of the stated objects and advantages and others.

The disclosed details are not to be taken as limitations on the invention, except as those details may be included in the appended claims.

The embodiments of the invention in which an exclusive property or privilege is claimed are:

1. A method for continuously embossing a precision optical pattern requiring sharp angles and flatness of faces in certain detail, on one surface of a continuous resinous sheeting material, the method being performed with the aid of a generally cylindrical endless metal embossing element having an inner surface and an outer surface the outer surface having a precision optical embossing pattern which is the reverse of the precision optical pattern to be formed on one surface of said sheeting, the method comprising the steps of:

(a) continuously moving the endless embossing element along a closed course through a heating station, where said embossing element is heated through its inner surface to a predetermined temperature and then to a cooling station where said embossing element is cooled below said predetermined temperature;

(b) continuously feeding onto said embossing element as it passes through a part of said heating station superimposed resinous film and sheeting materials, said resinous materials of said film and said sheeting each having different glass transition temperatures, said sheeting being in direct contact with lhe outer precision patterned surface of said embossing tool;

(c) continuously heating said embossing element to said predetermined temperature at said heating station, said temperature being greater than the glass transition temperature of said sheeting and less than the glass transition temperature of said resinous film;

(d) pressing said superimposed film and sheeting against said embossing element at a plurality of pressure points sequentially spaced along said heating station with one surface of said sheeting confronting and engaging said precision optical pattern on said embossing element until said one surface of said sheeting conforms to said precision optical embossing pattern;

(e) continuously passing said embossing element and said superimposed film and sheeting through said cooling station where the temperature of said embossing element and said sheeting is lowered below said sheeting glass transition temperature, with said film serving to substantially continuously maintain said sheeting in engagement with said embossing element through the heating station and through said cooling station; and (f) continuously stripping said superimposed layer of film and embossed sheeting from said embossing element, said film being later strippable from the other face of said sheeting without destroying said optical pattern formed on said one face of said sheeting.

2. The method of claim 1, wherein said course is cylindrical through the heating station and said pressure points are provided by at least three spaced pressure rollers.

3. The method of claim 1, wherein said embossing tool is a thin flexible seamless metal belt, the heating station is provided by an internally heated heating roller, the cooling station is provided by an internally cooled cooling roller and the inner surface of said belt passes over said heating roller and said cooling roller.

4. The method of claim 1, wherein said sheeting is continuously pressed against said element between adjacent pairs of said pressure points by means of an auxiliary belt.

5. The method of claim 1, wherein said precision optical pattern is in the form of an array of female cube-corner type elements whereby the sheeting formed thereby has male cube-corner elements on the one face thereof in contrast with said tool, and the finished sheeting thereby is provided with an array of retroreflective cube-corner elements thereon.

6. The method of claim 1, wherein said sheeting is acrylic, said film is polyester, the temperature of said embossing pattern at said heating station is sufficiently high to raise the temperature of said sheeting to a range between 425? F. and 475? F., and the temperature of said embossing pattern at said cooling station is sufficiently low to lower the temperature of said sheeting to 200? F. or below.

7. The method of claim 6 wherein the temperature of said sheeting is raised to about 450° F. and lowered to about 180° F.

8. The method of claim 6 wherein said film is transparent and the optical properties of the sheeting are continuously monitored without removing said film from the reflective sheeting.

9. The method of claim 1 wherein said heating station is provided by an infrared heater and said cooling station is provided by cooling liquid in which the bottom of said drum is immersed and the portion of the course of said drum from said heater to said liquid is the heating station.

10. Apparatus for continuously embossing a precision optical pattern on one surface of transparent resinous material, said apparatus comprising embossing means including a continous seamless embossing tool in the form of a thin metal element having an inner surface and an outer surface, its outer surface having a precision optical embossing pattern thereon which is the reverse of the precision optica pattern to be formed in the resinous material.

11. The apparatus of claim 10, wherein said embossing means also comprises means for continuously moving said embossing element along a closed course, means for introducing superimposed film and sheeting df resinous materials onto said embossing element with one face of said sheeting in direct contact with said optical pattern on said embossing element, heating means for raising the temperature of said embossing pattern to be above the glass transition temperature of said sheeting and below the glass transition temperature of said film while said embossing element is in a first portion of its course, cooling means for lowering the temperature of said embossing element to be below said glass transition temperature while said element is in a second portion of its course, a plurality of pressure points sequentially spaced along said first portion of said course for pressing said superimposed film and sheeting against said embossing element with said one surface of said sheeting confronting and engaging said embossing pattern until said one surface conforms to said embossing pattern, with said film serving to substantially continuously maintain said sheeting in engagement with said embossing element until the latter passes said second portion of said course and means for thereafter stripping said superimposed film and sheeting from said embossing element.

12. Apparatus of claim 11, wherein said precision optical pattern comprises an array of cube-corner type reflective elements.

13. Apparatus of claim 11 further including means for continuously monitoring the optical properties of the sheeting so produced.

14. Apparatus of claim 11 wherein said embossing element is a thin seamless flexible metal belt.

15. Apparatus of claim 10 wherein said embossing element is a seamless centerless cylindrical drum.

16. Apparatus of claim 11 wherein said pressure points are provided by at least three spaced pressure rollers.

17. Apparatus of claim 11, wherein said pressure rollers are of resilient material and have a durometer hardness from Shore A 20 to 90.

18. Apparatus of claim 17 wherein said pressure rollers are of silicone rubber with a durometer hardness from Shore A 60 to 90.

19. Apparatus of claim 14 wherein the heating means is provided by an internally heated heating roller, the cooling means is provided by an internally cooled cooling roller and the inner surface of said embossing element passes over said heating roller and said cooling roller and is in direct contact therewith.

20. Apparatus of claim 15 wherein the heating means is an infrared heater and the cooling means is a cooling liquid in which the bottom of the drum is immersed.

21. Apparatus of claim 11 wherein said embossing means further includes auxiliary means for pressing said sheeting against said element between adjacent pairs of said pressure points.

22. Apparatus of claim 20 wherein said pressure points are provided by at least three spaced pressure rollers and said auxiliary means includes an auxiliary metal strap engaging said pressure rollers to maintain constant and uniform pressure on said sheeting as it passes over the heating roller.

* * * * *

UNITED STATES PATENT AND TRADEMARK OFFICE
CERTIFICATE OF CORRECTION

PATENT NO. : 4,486,363
DATED : December 4, 1984
INVENTOR(S) : Robert M. Pricone, Sidney A. Heenan It is certified that error appears in the above—identified patent and that said Letters Patent is hereby corrected as shown below:

Claim 1, line 7 -- ,(comma) -- omitted after "surface", first occurrence.
Claim 6, line 4, "425?F" and "475?" should be -- 425°F -- and -- 475°F Claim 10, line 8 "optica" should be -- optical --

Claim 11, line 5, "df" should be -- of --

Signed and Sealed this

Fourteenth Day of May 1985

[SEAL]

Attest:

DONALD J. QUIGG

Attesting Officer     Acting Commissioner of Patents and Trademarks